Dec. 19, 1939.         F. KURZ         2,183,617
METER CONSTRUCTION
Filed June 15, 1938         4 Sheets-Sheet 1

Inventor:
Fred Kurz
By Brown, Jackson, Boettcher & Dienner.
Att'ys,

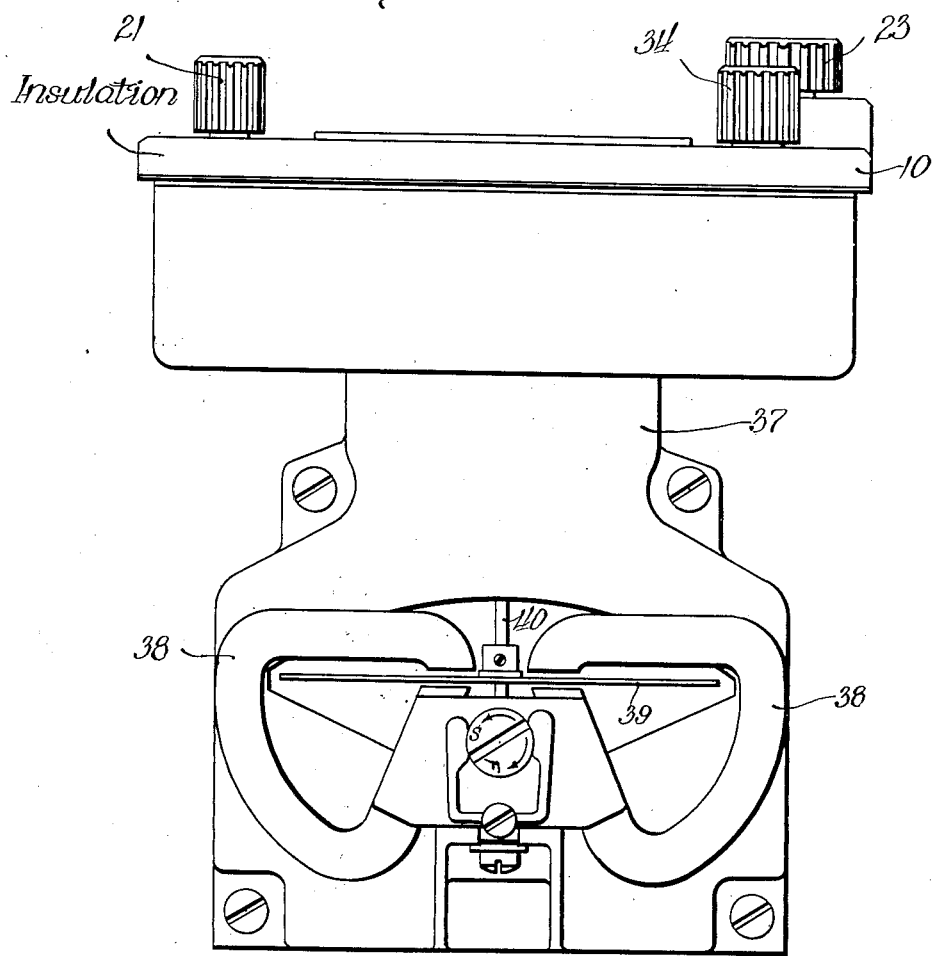

Dec. 19, 1939.   F. KURZ   2,183,617
METER CONSTRUCTION
Filed June 15, 1938   4 Sheets-Sheet 3

Inventor.
Fred Kurz
By Brown, Jackson, Boettcher & Dienner.
Attys

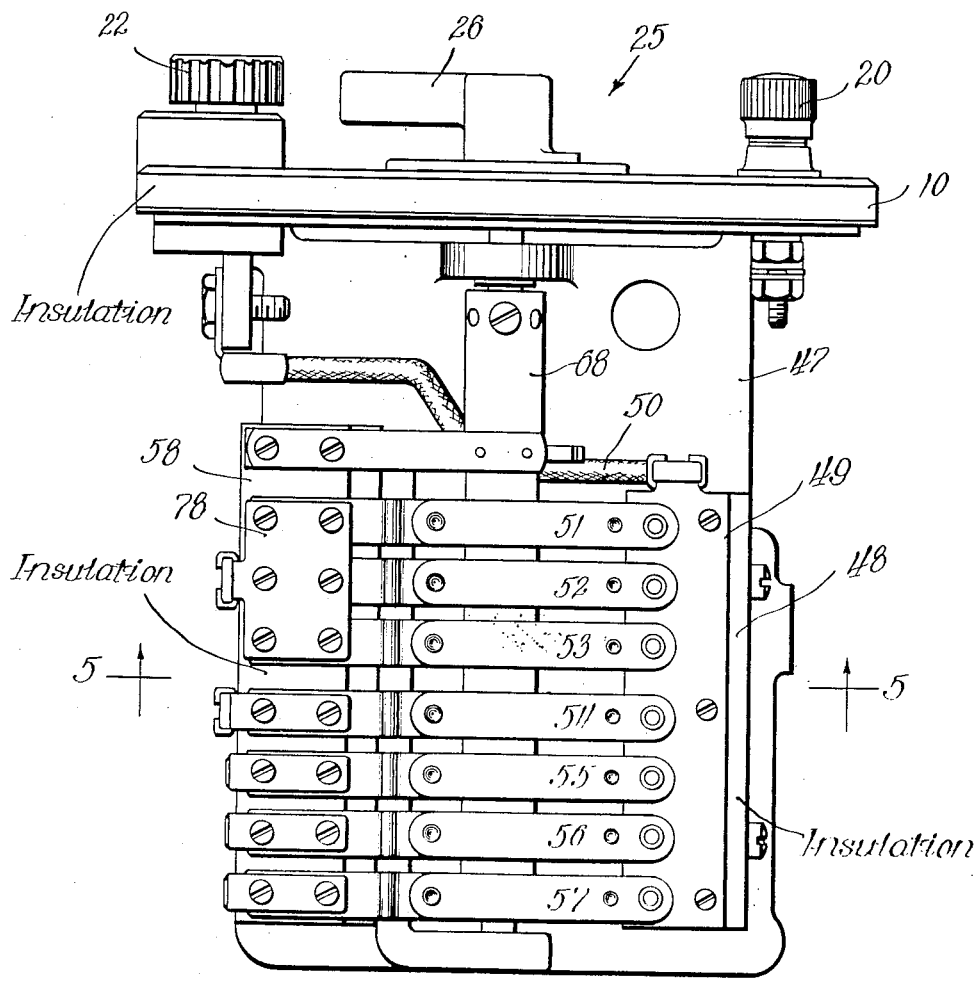

Patented Dec. 19, 1939

2,183,617

UNITED STATES PATENT OFFICE 2,183,617

METER CONSTRUCTION

Fred Kurz, Springfield, Ill., assignor to Sangamo Electric Company, Springfield, Ill., a corporation of Illinois Application June 15, 1938, Serial No. 213,765

12 Claims. (Cl. 171—34)

My invention relates, generally, to improvements in the construction of portable test watthour meters and it has particular relation to the provision of improved means for selectively connecting the current windings of the electromagnet into the test circuit in different combinations for a relatively wide range of current capacities.

In a single portable test watthour meter it is desirable that it be capable of accurate operation on a comparatively wide range of current capacities so that a single meter is capable of meeting practically any type of condition that will ordinarily be encountered in the field. In the past it has been the practice to provide such meters with switches which can be operated to different positions depending upon the current capacity of the circuit being tested to determine whether the watthour meter permanently connected thereto is registering accurately. In general these switches have been of a type employing a sliding contact between a rotatable member or drum and several switch blades. Such an arrangement has been unsatisfactory for many reasons.

One disadvantage of such a construction is that considerable arcing occurs between the drum and blades or brushes with the result that severe burning of the contact surfaces results. The particles of metal that are fused by the heat of the arcs find their way underneath the blades or brushes and eventually cause a great deal of pitting and cutting due to abrasive action with the result that fine metallic particles collect on various parts of the meter. This may be so serious as to cause interference with the motion of the disc. There have been cases where conducting paths have been formed by these fine metallic particles between terminals of the meter connected across the circuit being tested with the result that the interior of the meter may be seriously damaged and in some cases may even be burned up.

Another disadvantage of the prior constructions resides in the fact that the contact pressure between the drum and switch blades or brushes was variable because of the inherent difficulties in making contact engagement with a moving surface.

Accordingly, the object of my invention, generally stated, is to provide an improved form of portable test watthour meter that shall be simple and efficient in operation and which may be readily and economically manufactured.

The principal object of my invention is to provide for selectively connecting and disconnecting the current coils of a portable test watthour meter into and out of the test circuit with a minimum of arcing and resultant pitting and burning of contact surfaces.

Another object of my invention is to shift these connections without opening or closing the circuit between relatively sliding contact members.

A further object of my invention is to lift contact fingers away from stationary contact means and move the same into contact engagement therewith for shifting the current coil connections in a portable test watthour meter.

Other objects of my invention will, in part, be obvious and in part appear hereinafter.

My invention, accordingly, is disclosed in the embodiment thereof shown in the accompanying drawings, and it comprises the features of construction, combination of elements and arrangement of parts which will be exemplified in the construction hereinafter set forth, and the scope of the application of which will be indicated in the appended claims.

For a more complete understanding of the nature and scope of my invention, reference may be had to the following detailed description taken in connection with the accompanying drawings, in which:

Figure 2 is a view, in front elevation, of the portable test watthour meter shown in Figure 1, the case having been removed in order to more clearly illustrate the construction;

Figure 4 is a view, in rear elevation, of the portable test watthour meter shown in Figure 1 and illustrates the construction of the current selector switch that is employed for selectively connecting and disconnecting the current coils of the electromagnet;

Figure 1:
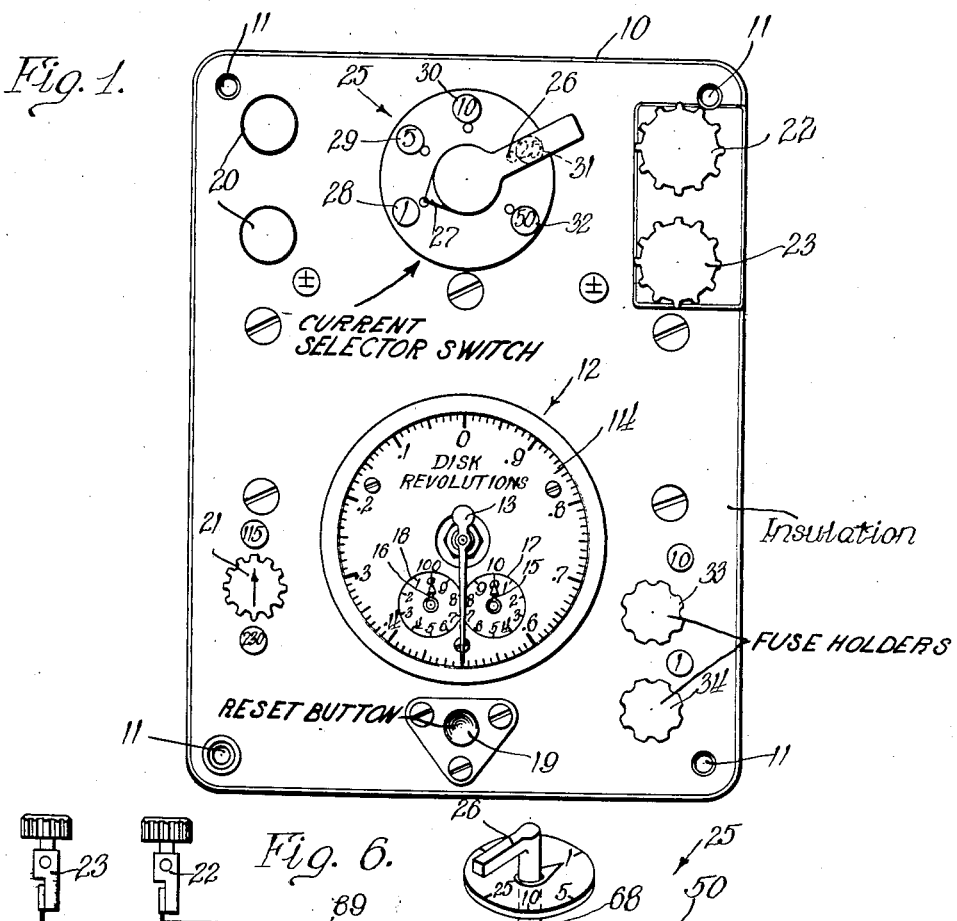
Figure 1 is a top plan view of a portable test watthour meter in which my invention is embodied.

Referring now particularly to Figure 1 of the drawings, it will be observed that the reference character 10 designates a panel that is formed of suitable insulating material, such as a molded phenolic condensation product. The panel 10 is provided with apertures 11 at its corners for receiving screws to mount it on a suitable metal casing. When these screws are removed, the panel 10 and the entire meter assembly is removable from the casing. As indicated hereinbefore, for purposes of illustration the casing has not been shown in the drawings.

A register, shown generally at 12, is provided and is of the three-pointer type. One pointer 13 is connected directly to the disc of the watthour meter and rotates therewith. The large circle 14 represents a single revolution of the disc and pointer 13 and is divided into hundredths. Pointers 15 and 16 are geared to the pointer 13 so that the pointer 15 makes one revolution for each ten revolutions of the pointer 13 while the pointer 16 makes one revolution for each hundred revolutions of the pointer 13. Circles 17 and 18 are provided for the pointers 15 and 16, respectively, as shown. A reset button 19 is provided for operating a suitable reset mechanism underneath the panel 10 for restoring the pointers 13, 15, and 16 to the zero position.

At the upper lefthand corner the panel 10 is provided with voltage terminal members 20 for connection across the circuit containing the watthour meter to be tested. A voltage selector switch 21 is provided for shifting the connections to the voltage coil of the electromagnet of the watthour meter for different voltage conditions of the circuit. For example, in one position the switch 21 may be operated to connect the voltage coil across a 115-volt circuit while in another position the voltage coil is connected across a 230-volt circuit. For the 115-volt connection two sections of the voltage winding are connected in parallel while for the 230-volt connection they may be connected in series circuit relation.

Current terminals 22 and 23 are provided at the upper righthand corner of the panel 10 and project through suitable bosses integrally formed on the upper and under surfaces of the panel. The current terminals 22 and 23 are intended to be connected in series circuit relation with the circuit containing the watthour meter to be tested.

Since the portable test watthour meter is intended for use on circuits having a wide range of current capacities, the current selector switch, shown generally at 25, is provided for shifting the connection to the current winding of the electromagnet of the watthour meter for meeting these different conditions. The switch 25 is provided with a handle 26 on the upper side of the panel 10 that may be grasped by the hand of the tester and rotated to the desired position. The handle 26 is provided with an indicator 27 to designate the particular coil combination that is connected across the current terminals 22 and 23. For example, markings 28, 29, 30, 31, and 32 are provided having numerals 1, 5, 10, 25, and 50, respectively, corresponding to different ampere capacities of circuits that may be tested. These figures may be engraved on raised bosses integrally formed with the panel 10 and then filled with paint to render them more visible.

At the lower right-hand corner of the panel 10 fuse containers 33 and 34 are provided for fusing the lower ampere rating current coils.

In Figure 2 of the drawings it will be observed that the frame 37 depends from the panel 10 and carries permanent magnets 38 for damping the rotation of the disc 39. The disc 39 is mounted for rotation with a shaft 40 that extends through the panel 10 and carries at its upper end the pointer 13, previously described.

Since the resetting mechanism, which is operated by the reset button 19, forms no part of the present invention, the details of construction thereof are not illustrated or described herein.

Figure 3:
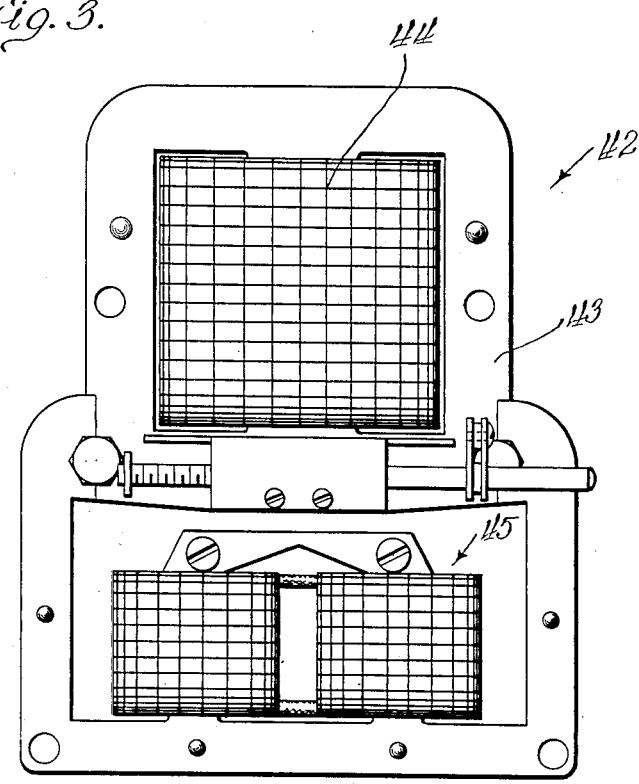
Figure 3 is a view, in front elevation, of the electromagnet of the watthour meter.

In Figure 3 of the drawings the electromagnet is shown generally at 42. It comprises a laminated core structure 43 having in the upper portion a voltage coil 44. As previously described, this coil may be divided into two sections for either series or parallel connection to circuits of different voltage as may be desired. In the lower portion the core 43 is provided with current windings, shown generally at 45. For illustrative purposes, the current windings 45 have been conventionally shown as being generally in the form of cylindrical coils. However, it will be understood that ordinarily the current windings 45 are formed of a few turns of relatively heavy insulated wire and comprise several sections which will be described in detail hereinafter.

Figure 5:
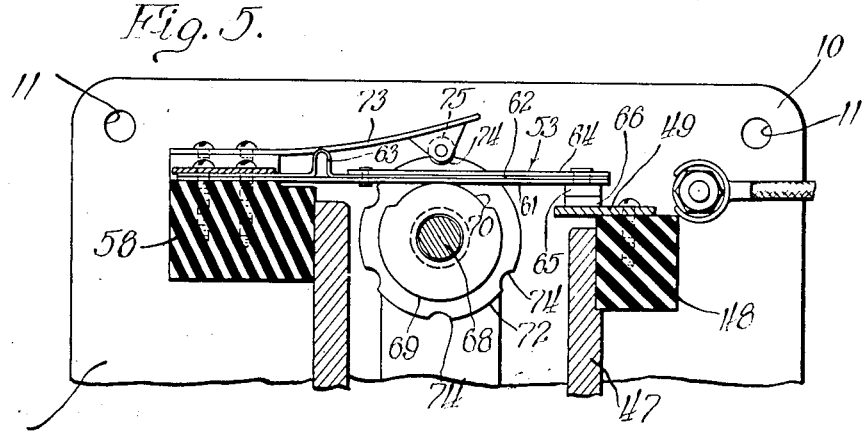
Figure 5 is a detail sectional view taken along the line 5—5 of Figure 4.

The details of construction of the current selector switch 25 are illustrated more clearly in Figures 4 and 5 of the drawings. As there shown, a frame 47 depends from the panel 10 and, in addition to carrying the electromagnet structure 42, Figure 3, is arranged to carry parts of the switch 25. A block 48 of insulation is suitably fastened to the frame 47 and carries a terminal plate 49 which may be connected by a lead 50 to the current terminal 22. Contact fingers 51 through 57 are provided for cooperating with the terminal plate 49 to complete different circuits to the current windings 45 which will be described in detail hereinafter. At their lefthand ends the contact fingers 51 through 57 are secured to a block 58 of insulation which is suitably mounted on the frame 47.

The details of construction of the contact fingers are identical. As shown in Figure 5 of the drawings, the contact finger 53 comprises a spring strip 61 underneath a shunt member 62 of high conductivity. The shunt member 62 is provided with a looped portion 63 adjacent its fastening to the block 58 in order to reduce flexing thereof to a minimum. A leaf member 64 is secured on top of the spring member 61 and shunt member 62 for increasing the rigidity thereof at the outer end. The circuit is opened and closed between high pressure silver contact buttons 65 and 66 that are carried respectively by the contact fingers 51 through 57 and the terminal plate 49. The silver contact buttons 65 and 66 may be secured in position by any suitable means such as by riveting.

With a view to lifting the silver buttons 65 carried by the contact fingers 51 through 57 from contact engagement with the silver contact buttons 66 carried by the terminal plate 49, a shaft 68 is provided having cam members 69 threaded or otherwise suitably secured thereon. The upper end of the shaft 68 extends through the panel 10, and the operating handle 26 is secured thereto as will be readily understood. It will be observed, as shown more clearly in Figure 5 of the drawings, that there is a cam member 69 individual to each of the contact fingers 51 through 57. Each cam member 69 is provided with a recessed portion 70 which, when in engagement with the undersurface of the respective contact fingers permits the silver contact button 65 carried thereby to be moved into high pressure contact engagement with the corresponding silver contact button 66 carried by the terminal plate 49 under the influence of the spring strip 61 of each contact finger. By staggering the positions of the recessed portions 70, it will be understood that it is possible to control the opening and closing of the contact fingers in accordance with the position of the shaft 68. The recessed portions 70 are arranged to overlap on successive positions of the shaft 68 so that the next pair of silver contact buttons will be closed before the preceding pair is opened. In this manner the circuit through the current windings 45 is never entirely opened and, as a result, arcing is reduced materially.

It is desirable that the shaft 68 be centered with respect to each operating position so that substantially the center portion of the recessed portion 70 will be in engagement with the undersurface of the spring member 61, as illustrated in Figure 5 of the drawings. For this purpose an index cam 72 is provided on the shaft 68 having an index finger 73 formed of resilient material cooperating therewith. The index cam 72 is provided with notches 74, each notch corresponding to a different position of the shaft 68, and a roller 75 is carried by the index finger 73 for engagement with these notches. On rotation of the shaft 68 by movement of the handle 26, the roller 75 is caused to rotate out of the particular notch 74 in which it may be located and continues to rotate along the outer periphery of the index cam 72 until the next notch 74 is encountered.

It will be understood that each of the notches 74 corresponds to one of the markings 28, 29, 30, 31, or 32 on the panel 10 with which the pointer 27 cooperates to indicate the position of the shaft 68. In this manner the tester not only knows the particular current coil combination that is connected across the current terminals 22 and 23 but also, by turning the handle 26 until he feels the roller 75 center itself in a notch 77, he knows that proper contact engagement is taking place between the particular high pressure silver contact buttons 65 and 66 connected into the circuit.

Because the current carrying capacity of the silver contact buttons 65 and 66 is limited, it is desirable to use them in multiple for the higher current ratings. For example, for the 50 ampere setting the contact fingers 51, 52, and 53 are connected in parallel by the terminal plate 78. It will be understood that the cams 69 associated with these contact fingers 51, 52, and 53 will all be positioned in alignment so that the silver contact buttons 65 carried by these contact fingers can simultaneously be moved into and out of contact engagement with the corresponding silver contact buttons 66 carried by the terminal plate 49.

Figure 6:
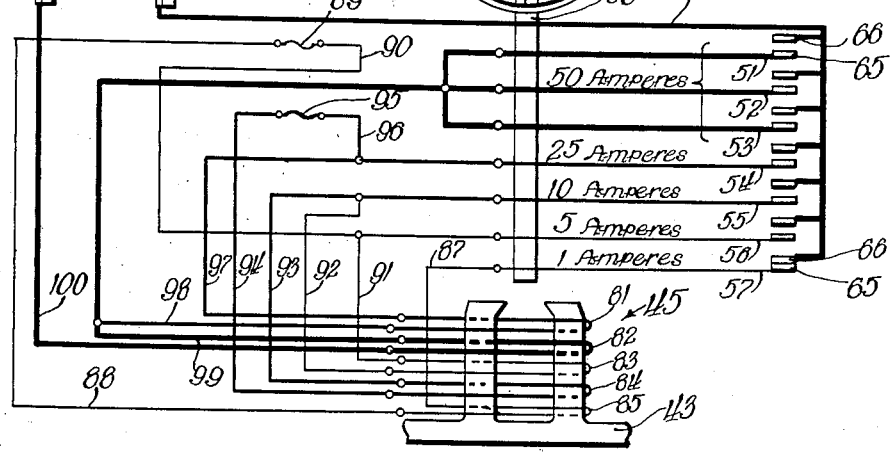
Figure 6 illustrates diagrammatically the circuit connections that are employed between the current terminals of the portable test watthour meter and the windings on the electromagnet through the current selector switch.

In Figure 6 of the drawings the circuit connections for the current selector switch 25 and current windings 45 are diagrammatically illustrated. As there shown, the current windings 45 comprise coils 81, 82, 83, 84, and 85 which are arranged to be selectively connected in various series circuit combinations by the switch 25 to meet different current capacities in the test circuit connected through the current terminals 22 and 23. The switch 25 is shown in the one ampere position in which the silver contact button 65 carried by the contact finger 57 is in contact engagement with its respective silver contact button 66 carried by the terminal plate 49. In this position of the switch 25 all of the sections 81, 82, 83, 84, and 85 of the windings 45 are connected in series circuit relation and across the current terminals 22 and 23.

This series circuit may be traced from the current terminal 22 through conductor 50, contact members 66 and 65, contact finger 57, conductor 87, winding 85, conductor 88, one ampere fuse 89, conductors 90 and 91, winding 83, conductors 92 and 93, winding 84, conductor 94, ten ampere fuse 95, conductors 96 and 97, winding 81, conductors 98 and 99, winding 82, and conductor 100 to the other current terminal 23. The one and ten ampere fuses 89 and 95 are provided for protecting the one, five and ten ampere coils 85, 83, and 84, respectively. They are positioned in the fuse holders 33 and 34 in the panel 10, previously described.

By rotating the handle 26 to the five ampere position, the silver contact button carried by the contact finger 56 will be moved into engagement with the corresponding silver contact member carried by the terminal plate 49. After this takes place, the silver contact button carried by the contact finger 57 is moved out of engagement with its corresponding silver contact button carried by the terminal plate 49. In the five ampere position, the circuit is identical with that previously traced except that the one ampere winding 85 is not connected in circuit. Windings 81, 82, 83, and 84 only are connected in series circuit relation and across the current terminals 22 and 23.

In the ten ampere position of the current selector switch 25 only windings 81, 82, and 84 are connected in series circuit relation. In the twenty-five ampere position of the current selector switch 25, only windings 81 and 82 are connected in series circuit relation while in the fifty ampere position only the winding 82 is connected across the current terminals 22 and 23.

Since certain changes may be made in the above construction and different embodiments of the invention may be made without departing from the scope thereof, it is intended that all matter contained in the foregoing description or shown in the accompanying drawings shall be interpreted as illustrative and not in a limiting sense.

I claim as my invention:

1. In a portable test watthour meter, in combination, a current element having a plurality of windings, a switch means for selectively connecting said windings into circuits of different current capacities including stationary contact means and a plurality of cooperating contact fingers, and manually operable means arranged and adapted to simultaneously move one of said contact fingers toward and another away from said stationary contact means in a predetermined sequence.

2. In a portable test watthour meter, in combination, a current element having a plurality of windings, switch means for selectively connecting said windings into circuits of different current capacities including stationary contact means and a plurality of cooperating contact fingers, and manually operable cam means for simultaneously moving one of said contact fingers toward and another away from said stationary contact means in such manner that the circuit is not opened between said contact means and a contact finger before it is closed between said contact means and another contact finger.

3. In a portable test watthour meter, in combination, a current element having a plurality of windings, switch means for selectively connecting said windings into circuits of different current capacities including terminal means carrying a plurality of contact buttons and a plurality of cooperating fingers each carrying a contact button for contact engagement with one of the contact buttons carried by the terminal means, and manually operable means arranged and adapted to simultaneously move one of said fingers and the contact button carried thereby toward and another away from said contact buttons carried by said terminal means.

4. In a portable test watthour meter, in combination, a current element having a plurality of windings, switch means for selectively connecting said windings into circuits of different current capacities including terminal means carrying a plurality of contact buttons and a plurality of cooperating fingers each carrying a contact button for contact engagement with one of the contact buttons carried by the terminal means, and manually operable cam means for simultaneously moving one of said fingers and the contact button carried thereby toward and another away from said contact buttons carried by said terminal means in such manner that the circuit is not opened between any pair of contact buttons before it is closed between another pair of contact buttons.

5. In a portable test watthour meter, in combination, a current element having a plurality of windings, switch means for selectively connecting said windings in different series circuit combinations for use in external circuits having different current capacities including stationary contact means for connection to one terminal of an external circuit and a plurality of cooperating contact fingers individually connected to said windings, and manually operable means arranged and adapted to simultaneously move one of said contact fingers toward and another away from said stationary contact means in a predetermined sequence.

6. In a portable test watthour meter, in combination, a current element having a plurality of windings, switch means for selectively connecting said windings in different series circuit combinations for use in external circuits having different current capacities including stationary contact means for connection to one terminal of an external circuit and a plurality of cooperating contact fingers individually connected to said windings, and manually operable cam means for moving said contact fingers toward and away from said stationary contact means in such manner that the circuit is not opened through one series combination of said windings before it is closed through another series combination thereof.

7. In a portable test watthour meter, in combination, a current element having a plurality of windings, switch means for selectively connecting said windings in different series circuit combinations for use in external circuits having different current capacities including a terminal plate for connection to an external circuit carrying a plurality of contact buttons and a plurality of cooperating fingers individually connected to said windings and each carrying a contact button for contact engagement with one of the silver contact buttons carried by the terminal plate, and manually operable means arranged and adapted to simultaneously move one of said fingers and the contact button carried thereby toward and another away from said contact buttons carried by said terminal plate in a predetermined sequence.

8. In a portable test watthour meter, in combination, a current element having a plurality of windings, switch means for selectively connecting said windings in different series circuit combinations for use in external circuits having different current capacities including a terminal plate for connection to an external circuit carrying a plurality of silver contact buttons and a plurality of cooperating fingers individually connected to said windings and each carrying a silver contact button for contact engagement with one of the silver contact buttons carried by the terminal plate, and manually operable cam means for moving said fingers and silver contact buttons carried thereby toward and away from said silver contact buttons carried by said terminal plate in such manner that the circuit is not opened through one series combination of said windings before it is closed through another series combination thereof.

9. In a portable test watthour meter, in combination, a panel, a watthour meter mechanism carried by said panel including a current element having a plurality of windings, switch means carried by said panel for selectively connecting said windings for use in external circuits having different current capacities including stationary contact means and a plurality of cooperating contact fingers connected to said windings, a pair of current terminals carried by said panel, circuit means interconnecting one current terminal and said stationary contact means and the other current terminal and said windings, and operating means extending through said panel for moving said contact fingers toward and away from said stationary contact means.

10. In a portable test watthour meter, in combination, a panel, a watthour meter mechanism carried by said panel including a current element having a plurality of windings, switch means carried by said panel for selectively connecting said windings in different series circuit combinations for use in external circuits having different current capacities including a terminal plate carrying a plurality of silver contact buttons and a plurality of cooperating fingers individually connected to said windings and each carrying a silver contact button for contact engagement with one of the silver contact buttons carried by the terminal plate, a pair of current terminals carried by said panel, circuit means interconnecting one current terminal and said terminal plate and the other current terminal and one of said windings, and manually operable cam means extending through said panel for moving said fingers and silver contact buttons carried thereby toward and away from said silver contact buttons carried by said terminal plate in such manner that the circuit is not opened through one series combination of said windings before it is closed through another series combination thereof.

11. In a portable test watthour meter, in combination, a panel, a watthour meter mechanism carried by said panel including a current element having a plurality of windings, switch means carried by said panel for selectively connecting said windings for use in external circuits having different current capacities including stationary contact means and a plurality of cooperating contact fingers connected to said windings, a pair of current terminals carried by said panel, circuit means interconnecting one current terminal and said stationary contact means and the other current terminal and said windings, operating means extending through said panel for moving said contact fingers toward and away from said stationary contact means, and indexing means cooperating with said operating means for centering the same in any one of a plurality of positions to insure contact engagement between a contact finger and said stationary contact means in each position.

12. In a portable test watthour meter, in combination, a panel, a watthour meter mechanism carried by said panel including a current element having a plurality of windings, switch means carried by said panel for selectively connecting said windings in different series circuit combinations for use in external circuits having different current capacities including a terminal plate carrying a plurality of silver contact buttons and a plurality of cooperating fingers individually connected to said windings and each carrying a silver contact button for contact engagement with one of the silver contact buttons carried by the terminal plate, a pair of current terminals carried by said panel, circuit means interconnecting one current terminal and said terminal plate and the other current terminal and one of said windings, manually operable cam means extending through said panel for moving said fingers and silver contact buttons carried thereby toward and away from said silver contact buttons carried by said terminal plate in such manner that the circuit is not opened through one series combination of said windings before it is closed through another series combination thereof, indexing means cooperating with said manually operable cam means for centering the same in any one of a plurality of positions to insure contact engagement between at least one pair of silver contact buttons in each position, indicating means carried by said manually operable cam means, and said panel having markings registering with said indicating means to designate the particular coil combination connected across said pair of current terminals.

FRED KURZ.